US008447505B2

(12) United States Patent
Crombez et al.

(10) Patent No.: US 8,447,505 B2
(45) Date of Patent: May 21, 2013

(54) METHOD AND SYSTEM FOR EXTENDING AN OPERATING RANGE OF A MOTOR VEHICLE

(75) Inventors: Dale Scott Crombez, Livonia, MI (US); Ryan Skaff, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 13/029,488

(22) Filed: Feb. 17, 2011

(65) Prior Publication Data

US 2011/0160991 A1 Jun. 30, 2011

(51) Int. Cl.
*G06F 19/00* (2006.01)

(52) U.S. Cl.
USPC .......................................... 701/123

(58) Field of Classification Search
None
See application file for complete search history.

(56) References Cited

U.S. PATENT DOCUMENTS

| | | | |
|---|---|---|---|
| 5,839,416 A | 11/1998 | Kruiswyk et al. | |
| 6,484,088 B1 | 11/2002 | Reimer | |
| 7,668,644 B2 | 2/2010 | Tengler et al. | |
| 2006/0286419 A1 | 12/2006 | Binder et al. | |
| 2007/0298928 A1* | 12/2007 | Yamanaka et al. | 477/15 |
| 2008/0162008 A1* | 7/2008 | Kojima et al. | 701/55 |
| 2008/0182463 A1* | 7/2008 | St-Pierre et al. | 440/1 |
| 2008/0248923 A1 | 10/2008 | Otsubo | |
| 2009/0013952 A1 | 1/2009 | Deniston et al. | |
| 2009/0058326 A1* | 3/2009 | Oyobe et al. | 318/53 |
| 2010/0063717 A1* | 3/2010 | Proefke et al. | 701/123 |
| 2010/0106514 A1 | 4/2010 | Cox | |
| 2010/0250059 A1 | 9/2010 | Sekiyama et al. | |
| 2011/0146945 A1* | 6/2011 | Morita et al. | 165/51 |
| 2011/0153178 A1* | 6/2011 | Westendorf | 701/96 |
| 2011/0241827 A1* | 10/2011 | Varoglu | 340/5.52 |

FOREIGN PATENT DOCUMENTS

| | | |
|---|---|---|
| GB | 2277619 A | 11/1994 |
| JP | 58021048 A1 | 2/1983 |
| JP | 58023249 A | 2/1983 |
| JP | 63254257 A | 10/1988 |

OTHER PUBLICATIONS

FJR Forum, ECM "economy mode" when fuel light flashing? http://www.fjrforum.com/forum/lofiversion/index.php/t103118.html, May 29, 2009.
All Experts Search, Pontiac Repair, 1998 Pontiac Transport Montana, Serial Data Stream, Digital Information, pp. 1-5, May 29, 2009.
Office Action for U.S. Appl. No. 13/029,547 (FMC 3409PUS) dated Oct. 11, 2011.
Final Office Action for U.S. Appl. No. 13/029,547 (FMC3409PUS) dated Apr. 3, 2012.

* cited by examiner

*Primary Examiner* — Thomas Tarcza
*Assistant Examiner* — Adam Alharbi
(74) *Attorney, Agent, or Firm* — David B. Kelley; Brooks Kushman P.C.

(57) ABSTRACT

A method and system are described for extending an operating range of a motor vehicle, the vehicle having an economy mode of operation. When the vehicle fuel level decreases below a first threshold, an indication is provided to a vehicle user that the vehicle will enter the economy mode of vehicle operation. The economy mode of vehicle operation is automatically entered a predetermined period of time after providing the indication to the vehicle user. The economy mode of vehicle operation is exited in response to a user command to exit the economy mode of vehicle operation.

20 Claims, 3 Drawing Sheets

METHOD AND SYSTEM FOR EXTENDING AN OPERATING RANGE OF A MOTOR VEHICLE

CROSS-REFERENCE TO RELATED APPLICATIONS

This application is related to U.S. application Ser. No. 13/029,547, filed on Feb. 17, 2011, which is incorporated by reference in its entirety herein.

BACKGROUND

1. Technical Field

The following relates to extending the operating range of a motor vehicle at a reduced fuel level, where the vehicle may have a normal mode of operation and an economy mode of operation.

2. Background

Many automotive vehicles, especially hybrid vehicles, are increasingly equipped to provide users with driving or operating modes that attempt to optimize fuel economy. Such driving or operating modes may be referred to as "economy" or "econ" modes of vehicle operation.

An economy mode of vehicle operation may include several changes to the driving or operating behavior of the vehicle. Such changes may include, but are not limited to, limiting the speed of the vehicle, limiting the acceleration of the vehicle, modifying vehicle acceleration response characteristics, and limiting, changing or altering the settings of the climate control system of the vehicle. By improving fuel economy, these types of changes can help to extend the operating range of the vehicle.

A problem associated with economy mode vehicle operation, however, is that the vehicle user or driver is required to manually select the economy operating mode, such as by actuating a "button" or other device in the vehicle. Thus, there exists a need for a method and system for extending an operating range of a motor vehicle whereby an economy mode of vehicle operation may be entered automatically under certain conditions, while still providing the vehicle driver or user the ability to manually control the vehicle operating mode as between an economy mode and other modes of operation.

SUMMARY

According to one embodiment disclosed herein, a method is provided for extending an operating range of a motor vehicle, where the vehicle has an economy mode of operation. The method comprises providing, when a vehicle fuel level decreases below a first threshold, an indication to a vehicle user that the vehicle will enter the economy mode of vehicle operation, and automatically entering the economy mode of vehicle operation a predetermined period of time after providing the indication to the vehicle user. The method further comprises exiting the economy mode of vehicle operation in response to a user command to exit the economy mode of vehicle operation.

According to another embodiment, a system is provided for extending an operating range of a motor vehicle, where the vehicle has an economy mode of operation. The system comprises a controller for generating, when the vehicle fuel level decreases below a first threshold, an information signal for use in providing an indication to a vehicle user that the vehicle will enter the economy mode of vehicle operation.

The controller is also for generating an entry command signal for use in automatically entering the economy mode of vehicle operation a predetermined period of time after generating the information signal for use in providing the indication to the vehicle user, and generating an exit command signal for use in exiting the economy mode of vehicle operation in response to a user command to exit the economy mode of vehicle operation.

According to another embodiment, a system is provided for extending an operating range of a motor vehicle, the vehicle having an economy mode of operation. The system comprises a controller for generating, when the vehicle fuel level decreases below a first threshold and the economy mode of vehicle operation is authorized, an information signal for use in providing an indication to a vehicle user that the vehicle will enter the economy mode of vehicle operation.

The controller is further for generating, if the user fails to provide a command to refrain from entering the economy mode of operation during a predetermined period of time after generating the information signal for use in providing the indication to the vehicle user, an entry command signal for use in automatically entering the economy mode of vehicle operation. The controller is still further for generating an exit command signal for use in exiting the economy mode of vehicle operation in response to a user command to exit the economy mode of vehicle operation. The system further comprises a communications interface for outputting from the controller the information signal, entry command signal, and exit command signal, and for inputting to the controller signals indicative of user commands to refrain from entering the economy mode of operation, to exit the economy mode of operation, and authorizing the economy mode of vehicle operation.

A detailed description of these embodiments and accompanying drawings are set forth below.

DETAILED DESCRIPTION

As previously discussed, automotive vehicles are increasingly equipped to provide users with driving or operating modes that attempt to optimize fuel economy, which may be referred to as economy modes of vehicle operation. An economy mode may involve several changes to the driving or operating behavior of the vehicle. Such changes may include, but are not limited to, limiting vehicle speed, limiting vehicle acceleration, modifying vehicle acceleration response characteristics, and limiting or altering the vehicle climate control system settings. By improving fuel economy, these types of changes can help to extend the operating range of the vehicle.

However, a problem associated with economy mode operation is that the vehicle user or driver is required to manually select the economy operating mode, such as by actuating a "button" or other device in the vehicle. An improved method and system for extending an operating range of a vehicle would provide for automatically entering an economy mode of vehicle operation under certain conditions, yet still providing the vehicle driver or user with the ability to manually control the vehicle operating mode as between an economy mode and other modes of vehicle operation.

Figure 1:
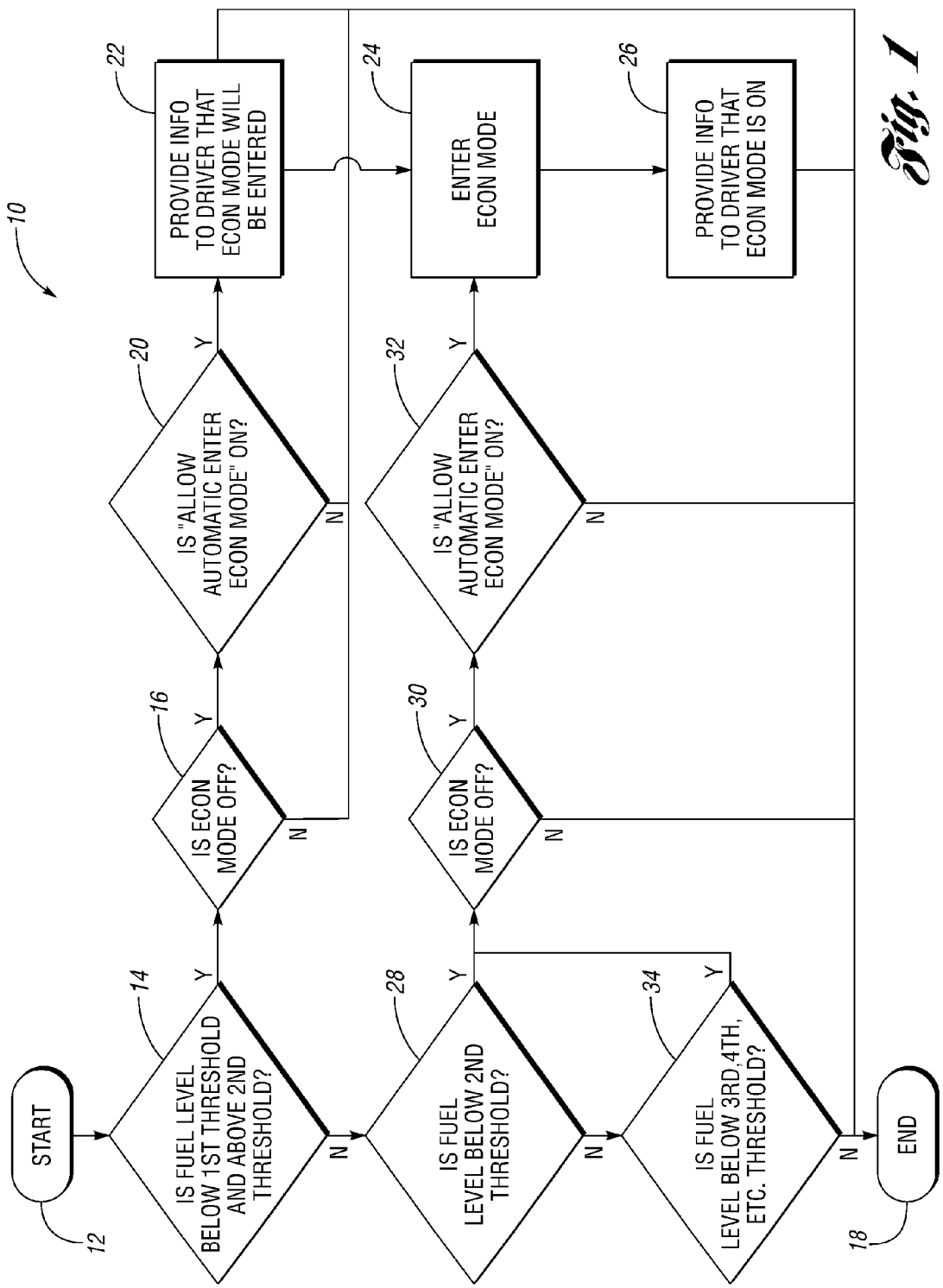
FIG. 1 is a simplified flowchart depicting features of a method and system for extending an operating range of a motor vehicle according to embodiments described herein.
Figure 2:
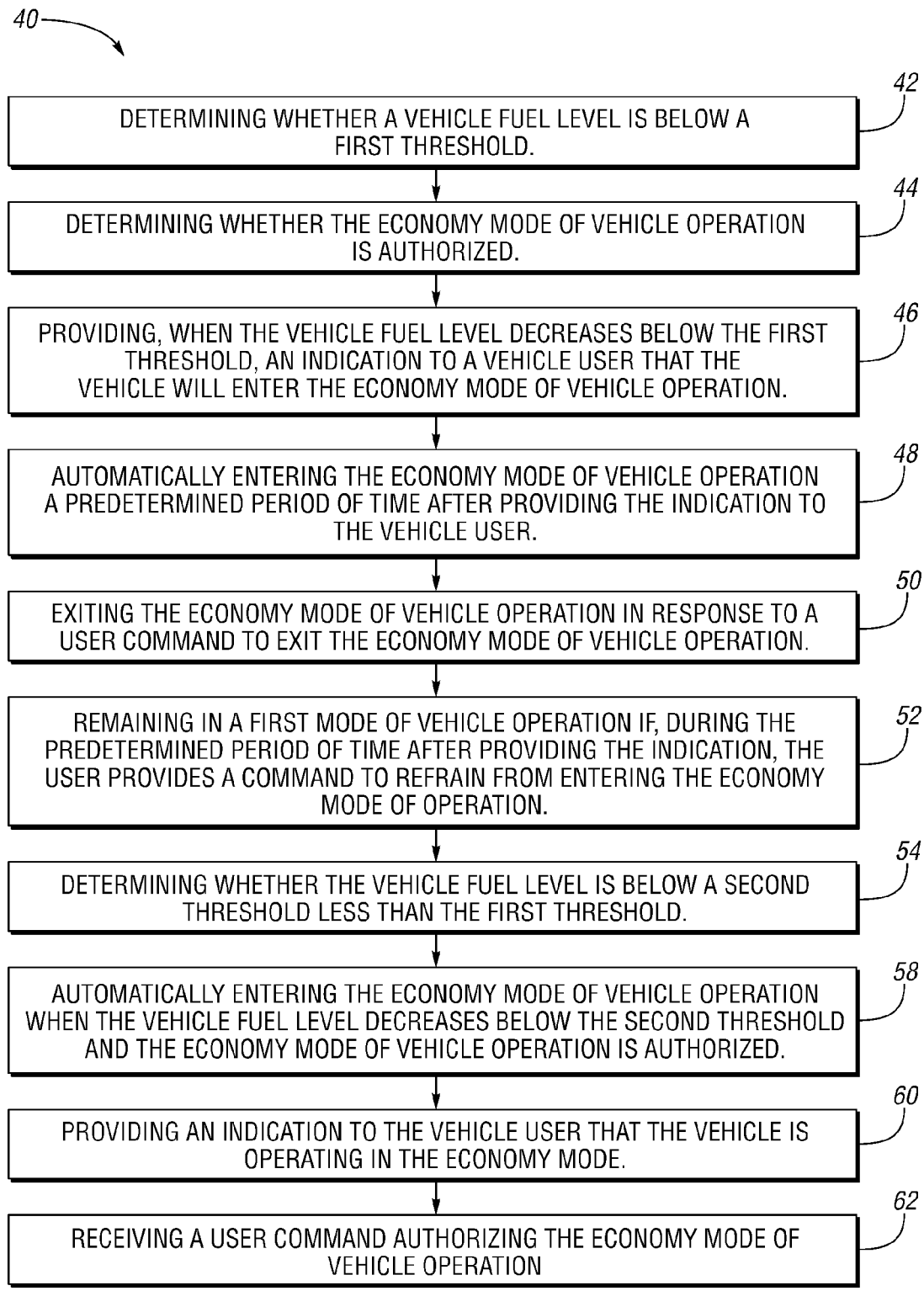
FIG. 2 is a simplified flowchart of a method for extending an operating range of a motor vehicle according to an embodiment described herein.
Figure 3:
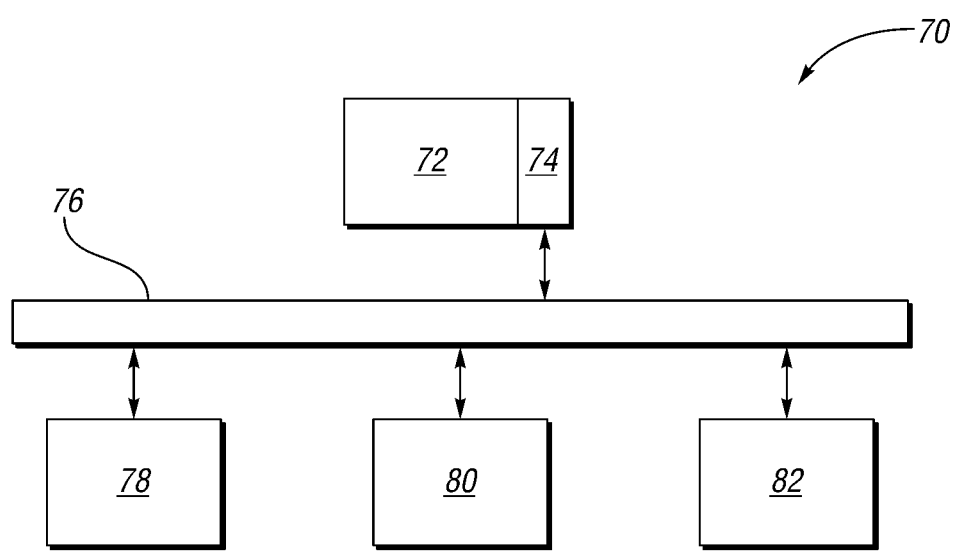
FIG. 3 is a simplified block diagram of a system for extending an operating range of a motor vehicle according to an embodiment described herein.

With reference to FIGS. 1-3, a method and system for extending an operating range of a motor vehicle will now be described. In that regard, the motor vehicle is provided with at least two modes of operation, which may be referred to as a normal mode of vehicle operation and an economy mode of vehicle operation. It should be noted, however, that any number of operating modes may be provided for the vehicle. At least one vehicle operating mode, however, comprises an economy mode of operation that includes changes in the operation of the vehicle, such as limiting the vehicle speed, limiting the vehicle acceleration, modifying vehicle acceleration response characteristics, and limiting or altering vehicle climate control system settings to improve fuel economy, thereby extending the operating range of the vehicle. Multiple numbers or types of economy modes of operation may also be provided, such as by employing different combinations of changes in the operation of the vehicle. Vehicle operating modes other than such economy modes may be referred to in any fashion, such as a normal operating mode or any other description. As well, as used herein, a first operating mode may refer to an existing or current vehicle operating mode or a previous vehicle operating mode, which may be an economy mode or an operating mode other than an economy mode.

Referring now to FIG. 1, a simplified flowchart (10) depicting features of a method and system for extending an operating range of a motor vehicle according to various embodiments described herein is shown. The primary condition for automatically entering an economy operating mode is during a low fuel level. Such a low fuel condition for automatically entering an economy mode may be coordinated with known systems for indicating low fuel levels, which may include providing a driver with messages, visual indicators and/or audible tones. In that regard, many vehicles include systems that provide an indication to the driver when the fuel level is at a point where an estimated 50 mile range to empty is expected.

As seen in FIG. 1, after start (12), a determination (14) may be made as to whether the vehicle fuel level is below a first threshold and above a second threshold less than the first threshold. As noted above, this may be accomplished in coordination with known systems for indicating low fuel levels. If the vehicle fuel level is below the first threshold and above the second threshold, a determination (16) may then be made as to whether the vehicle is currently operating in an economy mode. If the vehicle is currently operating in an economy mode, then the process may proceed to end (18). If the vehicle is not currently operating in an economy mode, then the vehicle could immediately enter an economy mode, thereby extending the vehicle range associated with the low fuel level.

Alternatively, however, if the vehicle is not currently operating in an economy mode, a determination (20) may then be made as to whether permission to undertake an automatic entry into an economy mode has been enabled, authorized or allowed. In that regard, a vehicle driver may be provided with a vehicle setting option to enable, authorize or allow entry into an economy mode of vehicle operation upon the occurrence of certain conditions. Similarly, the vehicle driver may configure the settings of such an option to disable, de-authorize or disallow entry of the vehicle into an economy operating mode. Such an option could be provided through a vehicle configuration menu in an instrument cluster, such as may be used to set odometer distances to miles or kilometers, set temperature indications to ° F. or ° C., set events and timing for interior and exterior lighting, and set various other vehicle parameters.

If operation in an economy mode has not been authorized, then the process may again proceed to end (18). However, if an economy mode of operation has been authorized, information may then be provided (22) to the vehicle driver or user that an economy mode of vehicle operation will be entered, which may occur a predetermined period of time after such information is provided. In that regard, information provided to the driver that an economy mode of operation will commence may or may not include information regarding such a predetermined time period.

Thereafter, automatic entry (24) of the vehicle into an economy mode of operation may occur. Such automatic entry (24) into an economy operating mode may be accompanied or followed by informing the vehicle driver or user that the vehicle is entering and/or has entered a lower or degraded performance mode. As seen in FIG. 1, upon such entry (24) of the vehicle into an economy operating mode, information is provided (26) to the vehicle driver or user that the vehicle is currently operating in an economy mode.

In that regard, such information may be provided using a display on a vehicle instrument panel, or a light or other lamp indicator on a vehicle instrument cluster. However, any other type of indication could also be used, such as text and/or audible messages provided via a message center that the vehicle has entered an economy mode. Examples of such messages could be "vehicle system behavior modified for increased range," or "economy mode entered for increased range." It should also be noted that such a vehicle message center could also be used to indicate or inform a vehicle driver or user that the vehicle is about to enter an economy mode of operation due to low fuel, as described above (22).

Once the vehicle has entered (24) an economy mode of operation, the vehicle user or driver could be provided with an option, such as by actuating a switch, to override the economy operating mode. That is, the vehicle driver or user could provide a command to exit the economy mode of operation and enter another mode of vehicle operation, which may include returning to a normal vehicle operating mode that does not include the changes to vehicle operation associated with the economy mode, such as limiting vehicle speed, limiting vehicle acceleration, modifying vehicle acceleration response characteristics, or restricting vehicle climate control settings.

In that same regard, when information is provided (22) to the vehicle driver or user that an economy mode of vehicle operation is about to commence, the vehicle user or driver could also be provided with an option, such as by actuating a switch, to prevent entry of the vehicle into the economy operating mode. That is, the vehicle driver or user could provide a command to refrain from entering the economy mode of operation and employ another mode of vehicle operation, which may include remaining in a normal vehicle operating mode that does not include the changes to vehicle operation associated with the economy mode, such as limiting vehicle speed, limiting vehicle acceleration, modifying vehicle acceleration response characteristics, or restricting vehicle climate control settings.

Still referring to FIG. 1, if a determination (14) is made that the vehicle fuel level is not below a first threshold and above a second threshold, then a determination (28) may be made as to whether the vehicle fuel level is below the second threshold. In that regard, such a second vehicle fuel level threshold could be an estimated 25 mile range to empty based on the current vehicle operating mode.

If the vehicle fuel level is below the second threshold, the vehicle could subsequently automatically enter an economy mode (24), provided a determination (30) has been made that the vehicle is not already operating in an economy mode and possibly a determination (32) has been made as to whether an economy mode of operation has been authorized, as previously described. In that regard, such an economy mode could be the same economy mode selected and/or entered (24) after the vehicle fuel level fell below the first threshold, or an alternative economy mode that further limits vehicle speed and/or vehicle acceleration, modifies vehicle acceleration response characteristics, or limits vehicle climate control settings beyond those employed in association with the economy mode selected and/or entered (24) after the vehicle fuel level fell below the first threshold. Moreover, such a strategy could be implemented when the vehicle fuel level falls below the second threshold even if the vehicle driver or user previously provided a command to refrain from entering an economy mode or previously provided a command to exit an economy mode after the vehicle fuel level fell below the first threshold.

It should also be noted that the vehicle driver or user could also provide a command to refrain from entering an economy mode or to exit an economy mode after a determination (28) has been made that the vehicle fuel level has fallen below the second threshold, in a similar fashion as previously described. As well, upon entry (24) of the vehicle into an economy operating mode after the vehicle fuel level falls below a second threshold, information may again provided (26) to the vehicle driver or user that the vehicle is currently operating in an economy mode, as also previously described.

Referring still to FIG. 1, a similar strategy as described in connection with the vehicle fuel level falling below the second threshold could also be implemented for a determination (34) as to whether the vehicle fuel level has fallen below a third threshold less than the second threshold, and/or below progressively lower fourth and further thresholds That is, in such an event, the vehicle could again subsequently automatically enter an economy mode (24), provided a determination (30) has been made that the vehicle is not already operating in an economy mode and a determination (32) has been made that the economy mode of operation has been authorized, as previously described.

Such a strategy could be again implemented when the vehicle fuel level falls below the lower threshold even if the vehicle driver or user previously provided a command to refrain from entering an economy mode or to exit an economy mode after the vehicle fuel level fell below a higher threshold. Moreover, the economy mode entered (24) could be the same as or an alternative to an economy mode which may have been previously selected and/or entered. The vehicle driver or user could also again provide a command to refrain from entering an economy mode or to exit an economy mode after a determination (34) has been made that the vehicle fuel level has fallen below the lower threshold, in a similar fashion as previously described. As well, upon entry (24) of the vehicle into an economy operating mode after the vehicle fuel level falls below the lower threshold, information may again provided (26) to the vehicle driver or user that the vehicle is currently operating in an economy mode, as also previously described.

It should be noted here that the strategy described above could be implemented on any type of vehicle because limitations on vehicle speed and/or acceleration, modifying vehicle acceleration response characteristics, and modifying climate control settings are not specific to a particular type of vehicle. However, because an economy mode is often associated with hybrid electric vehicles (HEV), such a strategy may be particularly suited for such vehicles. In addition to HEVs, other alternative fuel vehicles (e.g., electric vehicles, hydrogen fueled internal combustion engine or fuel cell vehicles, or vehicles powered by ethanol, E85, propane, natural gas (CNG) or any other types of alternative fuels) may also particularly benefit from this strategy.

Referring next to FIG. 2, a simplified flowchart depicting a method (40) for extending an operating range of a motor vehicle according to one embodiment is shown. As previously described, the vehicle may be equipped with a first mode of operation and an economy mode of operation. As seen in FIG. 2, the method (40) may comprise determining (42) whether a vehicle fuel level is below a first threshold, and may comprise determining (44) whether the economy mode of vehicle operation is authorized. The method may also comprise providing (46), when the vehicle fuel level decreases below the first threshold, an indication to a vehicle user that the vehicle will enter the economy mode of vehicle operation.

The method (40) may further comprise automatically entering (48) the economy mode of vehicle operation a predetermined period of time after providing the indication to the vehicle user, and exiting (50) the economy mode of vehicle operation in response to a user command to exit the economy mode of vehicle operation. The method may still further comprise remaining (52) in a first mode of vehicle operation if, during the predetermined period of time after providing the indication, the user provides a command to refrain from entering the economy mode of operation.

Referring still to FIG. 2, the method (40) for extending an operating range of a motor vehicle may also comprise determining (54) whether the vehicle fuel level is below a second threshold less than the first threshold, and determining (56) whether the economy mode of vehicle operation is authorized. The method (40) may further comprise automatically entering (58) the economy mode of vehicle operation when the vehicle fuel level decreases below the second threshold and the economy mode of vehicle operation is authorized. The method (40) may still further comprise providing (60) an indication to the vehicle user that the vehicle is operating in the economy mode, and receiving (62) a user command authorizing the economy mode of vehicle operation.

Referring next to FIG. 3, a system (70) for extending an operating range of a motor vehicle according to one embodiment is shown. Once again, the vehicle is equipped with a first mode of operation and an economy mode of operation. As seen in FIG. 3, the system may comprise a controller (72) and a communications interface (74). The controller (72) and communications interface may be provided in communication with various other vehicle components and/or devices via a vehicle bus or network (76). Such other vehicle components and/or devices may include an engine control module (78), a climate control system module (80), a user interface (82) and/or other components or devices (not shown).

In that regard, it should be noted that the user interface (82) may include various input and output elements such as lamps, lighted icons, a message center, speakers, a microphone, a video display (which may have touchscreen capabilities), switches (such as button or stalk switches), and/or any other type of user interface device known in the art. Any such input and output elements included with the user interface (82) may be provided at any appropriate location within the vehicle, such as in an instrument cluster, vehicle console or other location. As well, any such input and output elements may be provided at a single location or dispersed among multiple locations within the vehicle.

The controller (72) is provided for use in performing the various functions or operations described in detail above.

These may include determining whether a vehicle fuel level is below a first threshold, and determining whether the economy mode of vehicle operation is authorized. Alternatively, indications regarding any such determinations may be provided to the controller (72), such as in the form of signals transmitted over the vehicle bus or network (76) and input to the controller (72) by the communications interface (74). The controller (72) operations may also include generating, when the vehicle fuel level decreases below the first threshold and possibly, in addition, when the economy mode of vehicle operation is authorized, an information signal for use in providing an indication to a vehicle user that the vehicle will enter the economy mode of vehicle operation. Such operations may also include generating an entry command signal for use in automatically entering the economy mode of vehicle operation a predetermined period of time after generating the information signal for use in providing the indication to the vehicle user, and generating an exit command signal for use in exiting the economy mode of vehicle operation in response to a user command to exit the economy mode of vehicle operation. In that regard, the controller (72) may comprise a control module including one or more processors, and may include appropriate hardware, firmware and/or software for performing the operations described.

The communications interface (74) may be provided for use in outputting various signals from and inputting various signals to the controller (72). In that regard, the communications interface (74) may output from the controller (72) the information signal, entry command signal, and exit command signal previously described. Such signals may be transmitted over the vehicle bus or network (76) to an appropriate vehicle component or device, such as the engine control module (78), the climate control system module (80) and/or output elements of the user interface (82), for use in effectuating the strategy concerning extending an operating range of the vehicle as described in detail above.

The communications interface (74) may also input to the controller a signal indicative of the user command to exit the economy mode of operation, as also previously described. In that regard, such a signal may be received by the communications interface (74) over the vehicle bus or network (76) from an input element of the user interface (82), in such a fashion as previously described. The controller (72) operations may also include refraining from generating the entry command signal in order to remain in a first mode of vehicle operation if, during the predetermined period of time after generating the information signal for use in providing the indication, the user provides a command to refrain from entering the economy mode of operation. In that regard, the communications interface (74) may also input to the controller (72) a signal indicative of the user command to refrain from entering the economy mode of operation.

Operations of the controller (72) may also include determining whether the vehicle fuel level is below a second threshold less than the first threshold, and determining whether the economy mode of vehicle operation is authorized. Once again, indications of such determinations may alternatively be provided to the controller (72). The controller (72) operations may also include generating an entry command signals for use in automatically entering the economy mode of vehicle operation when the vehicle fuel level decreases below the second threshold and the economy mode of vehicle operation is authorized. The controller (72) operations may further include generating an exit command for use in exiting the economy mode of vehicle operation after the vehicle fuel level decreases below the second threshold in response to a user command to exit the economy mode of vehicle operation, and generating another information signal for use in providing an indication to the vehicle user that the vehicle is operating in the economy mode. The communications interface (74) may also input to the controller (72) a signal indicative of a user command authorizing the economy mode of vehicle operation.

Moreover, the controller (72) may also perform the operation of generating, when the vehicle fuel level decreases below the first threshold and possibly, in addition, when the economy mode of vehicle operation is authorized, an information signal for use in providing an indication to a vehicle user that the vehicle will enter the economy mode of vehicle operation. The controller (72) may further perform the operation of generating, if the user fails to provide a command to refrain from entering the economy mode of operation during a predetermined period of time after generating the information signal for use in providing the indication to the vehicle user, an entry command signal for use in automatically entering the economy mode of vehicle operation.

Once again, the various signals described above that are output from the controller (72), such as by the communications interface (74), may be transmitted over the vehicle bus or network (76) to an appropriate vehicle component or device, such as the engine control module (78), the climate control system module (80) and/or output elements of the user interface (82), for use in effectuating the strategy previously described concerning extending an operating range of the vehicle. Similarly, the various signals described above that are input, such as by the communications interface (74), to the controller (72) may be received over the vehicle bus or network (76) from input elements of the user interface (82).

As is readily apparent from the foregoing description, a method and system for extending an operating range of a vehicle has been described, where the vehicle may have a normal mode of operation and an economy mode of operation. In that regard, an economy mode of vehicle operation is entered automatically under certain conditions, while still providing a vehicle driver or user the ability to manually control the vehicle operating mode as between an economy mode and other modes of operation.

While certain embodiments of a method and system for extending the operating range of a motor vehicle have been illustrated and described herein, they are exemplary only and it is not intended that these embodiments illustrate and describe all those possible. Rather, the words used herein are words of description rather than limitation, and it is understood that various changes may be made without departing from the spirit and scope of the following claims.

What is claimed:

1. A system comprising: a controller configured to
    generate, when a vehicle fuel level decreases below a threshold, an indication to a user that a vehicle will enter an economy operating mode;
    generate a command for automatically entering the economy mode a predetermined time after generation of the indication;
    generate a command for exiting the economy mode in response to a user input;
    determine whether the vehicle fuel level is below the threshold; and
    determine whether the economy mode is authorized.

2. The system of claim 1 further comprising a communications interface configured to output from the controller the indication, the entry and exit commands, and to input to the controller the user input.

3. The system of claim 1 wherein the controller is further configured to refrain from generation of the entry command in order to remain in a first mode of vehicle operation if, during the predetermined period of time after generation of the indication, the user provides a command to refrain from entering the economy mode.

4. The system of claim 3 wherein the interface is further configured to input to the controller the user command to refrain from entering the economy mode.

5. The system of claim 1 wherein the controller is further configured to generate the entry command for automatically entering the economy mode when the vehicle fuel level decreases below a second threshold less than the threshold and the economy mode is authorized.

6. The system claim 5 wherein the controller is further configured to generate the exit command for exiting the economy mode after the vehicle fuel level decreases below the second threshold in response to a user command to exit the economy mode.

7. The system of claim 1 wherein the economy mode comprises one of limiting vehicle speed, limiting vehicle acceleration and altering vehicle climate control system operation.

8. The system of claim 1 wherein the controller is further configured to generate an indication to the user that the vehicle is operating in the economy mode.

9. The system of claim 1 wherein the interface is further configured to input to the controller a user command authorizing the economy mode.

10. A method comprising:
    determining whether a vehicle economy operating mode is authorized;
    providing, when a vehicle fuel level decreases below a threshold, an indication to a user that a vehicle will enter the economy mode;
    automatically entering the economy mode a predetermined time after providing the indication; and
    exiting the economy mode in response to a user input.

11. The method of claim 10 further comprising remaining in a first mode of vehicle operation if, during the predetermined time after providing the indication, the user provides a command to refrain from entering the economy mode.

12. The method of claim 10 further comprising:
    determining whether the vehicle fuel level is below a second threshold less than the threshold;
    automatically entering the economy mode when the vehicle fuel level decreases below the second threshold and the economy mode is authorized.

13. The method of claim 12 further comprising exiting the economy mode after the vehicle fuel level decreases below the second threshold in response to a user command to exit the economy mode.

14. The method of claim 10 wherein the economy mode comprises one of limiting vehicle speed, limiting vehicle acceleration and altering vehicle climate control system operation.

15. The method of claim 10 wherein exiting the economy mode comprises returning to a first mode of vehicle operation.

16. The method of claim 10 further comprising providing an indication to the user that the vehicle is operating in the economy mode.

17. The method of claim 10 further comprising receiving a user command authorizing the economy mode.

18. A method for extending an operating range of a motor vehicle having a first mode of operation and an economy mode of operation, the method comprising:
    determining whether the economy mode is authorized;
    generating an economy mode indication that the vehicle will enter the economy mode when a vehicle fuel level decreases below a first threshold;
    automatically entering the economy mode a predetermined period of time after generating the economy mode indication; and
    exiting the economy mode in response to a user command.

19. The method of claim 18 further comprising receiving a user command authorizing the economy mode.

20. A vehicle controller for extending an operating range of a motor vehicle having a first mode of operation and an economy mode of operation, the controller configured to:
    generate an economy mode indication that the vehicle will enter the economy mode when a vehicle fuel level decreases below a first threshold and the economy mode is authorized;
    generate a command for automatically entering the economy mode a predetermined period of time after generation of the economy mode indication; and
    generate a command for exiting the economy mode in response to a user command.

\* \* \* \* \*